(12) United States Patent
Inami et al.

(10) Patent No.: US 7,246,126 B2
(45) Date of Patent: Jul. 17, 2007

(54) COMMUNICATIONS SYSTEM FOR RETRIEVING INSTRUCTION FILES FROM A SERVER

(75) Inventors: Satoshi Inami, Moriguchi (JP); Takako Hirose, Hirakata (JP); Masashige Mizuyama, Neyagawa (JP); Atsunobu Kato, Ebina (JP); Munehito Matsuda, Neyagawa (JP); Hidehiko Shin, Moriguchi (JP); Hiromi Wada, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 252 days.

(21) Appl. No.: 10/046,172

(22) Filed: Jan. 16, 2002

(65) Prior Publication Data

US 2002/0099718 A1    Jul. 25, 2002

(30) Foreign Application Priority Data

Jan. 19, 2001  (JP) ............................. 2001-011249
Jan. 19, 2001  (JP) ............................. 2001-011252

(51) Int. Cl.
*G06F 7/00*      (2006.01)
*G06F 15/173*    (2006.01)
*G06F 17/30*     (2006.01)

(52) U.S. Cl. ...................... 707/100; 709/242
(58) Field of Classification Search ................ 707/100, 707/201, 1, 3; 709/219, 221, 220, 242
See application file for complete search history.

(56) References Cited

U.S. PATENT DOCUMENTS 5,909,544 A      6/1999  Anderson, II et al.
6,006,260 A     12/1999  Barrick, Jr. et al.
6,029,196 A *    2/2000  Lenz ......................... 709/221
6,708,187 B1 *   3/2004  Shanumgam et al. ....... 707/201
2003/0101238 A1* 5/2003  Davison ..................... 709/219

FOREIGN PATENT DOCUMENTS

| EP | 0 988 876   | 3/2000  |
| EP | 1 063 854   | 12/2000 |
| JP | 2000-076266 | 3/2000  |
| JP | 2000-270325 | 9/2000  |
| JP | 2000-330852 | 11/2000 |
| JP | 2000-514942 | 11/2000 |
| WO | 98/43380    | 10/1998 |

* cited by examiner

*Primary Examiner*—Sam Rimell
(74) *Attorney, Agent, or Firm*—Wenderoth, Lind & Ponack, L.L.P.

(57) ABSTRACT

A terminal-side communications control unit makes a request to a server for retrieving an instruction file that describes an instruction for transmitting transmission data. The server transmits the instruction file in response to the request for retrieving the instruction file. On receiving the instruction file, the terminal-side communications control unit causes an application executing unit to execute an application, and also forwards the instruction file to a transmission data generating unit. On receiving the instruction file, the transmission data generating part refers to the instruction file to generate, from generated data stored in a generated data storage unit, transmission data to be transmitted to the server.

20 Claims, 9 Drawing Sheets

```
<?xml version="1.0"?>
<UPLOAD CONTROL DATA>
  <INFORMATION TO BE REGISTERED>
    <GAME RESULTS>
      HIGH SCORE                         ⎫ 91
    </GAME RESULTS>
  </INFORMATION TO BE REGISTERED>
  <TRANSMISSION FORMAT>
    <QUERY FORMAT/>
    <METHOD>
      GET
    </METHOD>                            ⎬ 92
    <COMPRESSION FORMAT>
      NONE
    </COMPRESSION FORMAT>
  </TRANSMISSION FORMAT>
  <DESTINATION SERVER>
    http://game.xxx/regist.xxx            ⎬ 93
  </DESTINATION SERVER>
</UPLOAD CONTROL DATA>
```

Fig. 9

```
<?xml version="1.0"?>
<UPLOAD CONTROL DATA>
  <INFORMATION TO BE REGISTERED>                    ─91
    <GAME RESULTS>
      HIGH SCORE
    </GAME RESULTS>
  </INFORMATION TO BE REGISTERED>
  <TRANSMISSION FORMAT>
    <QUERY FORMAT/>
    <METHOD>
      GET
    </METHOD>                                       ─92
    <COMPRESSION FORMAT>
      NONE
    </COMPRESSION FORMAT>
  </TRANSMISSION FORMAT>
  <DESTINATION SERVER>
    http://game.xxx/regist.xxx                      ─93
  </DESTINATION SERVER>
</UPLOAD CONTROL DATA>
```

COMMUNICATIONS SYSTEM FOR RETRIEVING INSTRUCTION FILES FROM A SERVER

BACKGROUND OF THE INVENTION

1. Field of the Invention

The present invention relates to communications terminals and, more specifically, to a communications terminal for transmitting data retrieved by executing an application to a server.

2. Description of the Background Art

Conventionally, a system constructed by a WWW (World Wide Web) server and a client has been suggested, wherein execution of an application is related to data transmission between the server and the client. In such a system, information about a result of executing an application is transmitted from a client's terminal to the server, or data stored in the terminal is transmitted to the server by using a dedicated application.

One example of the above is a system where the application to be executed at the terminal is a game application, and the information indicating the result of executing the game application is a score obtained in the game. Specifically, the terminal transmits, as the result of executing the game, information about the score in the game to the server. Upon receiving the score, the server updates information about the user's records of the game. The information about the user's records becomes public through a Web page, or is returned to the terminal that transmitted the score.

Another example of the above is a system where data stored in the terminal, such as schedule information or telephone directory information, is uploaded to the server. This uploading is carried out by using a dedicated application stored in the terminal for transmitting the data to the server.

In the above system, the data transmission processing from the terminal to the server (hereinafter simply referred to as data transmission process) is specified in the application that carries out the processing. In other words, the application previously incorporates information about what data to be transmitted to the server, which format is used for transmission, to which server the data is transmitted, and other information. By following the incorporated information, the application carries out the data transmission process. Note that, in some cases, the above data transmission processing may be determined by a user's input. In such cases, the user has to specify data to be transmitted to the server, a transmission format, and a destination server, which is quite burdensome.

In the above conventional system, to change the data transmission process, the application itself has to be changed. This is because the application previously incorporates the information about the data transmission process. Consequently, a new application has to be installed in each terminal. For this reason, changing the data transmission process is very difficult in the conventional system.

For example, for changing a game application so as to transmit to the server not only the score of the game but also a name of a player, a new application has to be installed in each terminal. The application itself also has to be changed for changing the format of the data to be transmitted to the server or the server that should receive the data.

Furthermore, the application stored in the conventional terminal includes data about the data transmission process, thereby increasing the data size of the application. This increase is a significant drawback to a terminal having relatively small memory, such as a cellular phone.

SUMMARY OF THE INVENTION

Therefore, an object of the present invention is to provide a communications terminal capable of easily changing a process for transmitting data to a server, and also capable of reducing a data amount of an application stored in the terminal.

The present invention has the following features to attain the above object.

A first aspect of the present invention is directed to a communications terminal capable of communicating with a server via a network, and the communications terminal includes an application executing unit for executing an application. A retrieval requesting unit is also provided for making, before or after the application is activated, a retrieval request to the server for retrieving an instruction file that describes an instruction for transmitting to the server all or part of data generated as a result of executing the application. The terminal also includes a transmission processing unit for carrying out transmission to the server after the application is executed, by following the instruction described in the instruction file transmitted from the server in response to the retrieval request.

In the above described first aspect, a request for retrieving an instruction file is made in relation to execution of the application. The communications terminal determines transmission processing to the server based on the instruction file transmitted from the server. Therefore, the transmission processing from the communications terminal to the server can be easily changed only by changing the instruction included in the instruction file. This facilitates changes in data transmission processing to the server. Also, in the above first aspect, the application itself does not have to define anything about transmission processing to the server. Therefore, the amount of application data stored in the terminal can be reduced.

According to a second aspect, in the first aspect, the application executing unit starts executing the application upon receipt of the instruction file transmitted from the server in response to the retrieval request.

In the above described second aspect, the user can enable the application to be automatically executed by making a request for retrieving an instruction file.

According to a third aspect, in the first aspect, the retrieval requesting unit makes the retrieval request by specifying the instruction file stored in the server with a Web browser.

In the above described third aspect, the user can enable the transmission processing on the server only by carrying out a simple operation on the Web browser, such as clicking link information. Especially, in a case where the communications terminal is a mobile communications terminal, an input device provided thereto is often capable of only a simple operation. In such a case, it is quite effective to be able to execute the transmission processing on the server with such a simple operation.

According to a fourth aspect, in the first aspect, the instruction file includes transmission information specifying data for specifying transmission data to be transmitted to the server. The transmission processing unit includes a transmission data generating unit for determining, based on the transmission information specifying data, the transmission data to be transmitted to the server from among the generated data, and a transmitting unit for transmitting the transmission data to the server.

In the above described fourth aspect, by changing the transmission information specifying data included in the instruction file, the data to be transmitted to the server can be changed. Therefore, the server can easily change the data to be transmitted to the communications terminal, thereby enabling only the required data to be transmitted to the communications terminal.

According to a fifth aspect, in the first aspect, the instruction file includes transmission format specifying data for specifying a format used for transmitting transmission data to be transmitted to the server. The transmission processing unit includes a transmission format determining unit for determining a transmission format of the transmission data based on the transmission format specifying data, and a transmitting unit for transmitting the transmission data in the transmission format determined by the transmission format determining unit.

In the above described fifth aspect, by changing the transmission format specifying data included in the instruction file, the transmission format used for transmitting the data to the server can be changed. Therefore, even if the processing program at the server side is changed and the format of the data to be processed is changed accordingly, the application at the communications terminal side does not have to be changed. Furthermore, a plurality of servers support different transmission formats, and all of these formats do not have to be defined in the application. That is, even if there is a plurality of servers, their transmission formats do not have to be the same.

According to a sixth aspect, in the first aspect, the instruction file includes destination server specifying data for specifying a destination server in the transmission, and the transmission processing unit carries out the transmission to the destination server specified by the destination server specifying data.

In the above-described sixth aspect, by changing the destination server specifying data included in the instruction file, the destination server can be easily changed. Therefore, for example, even if the processing load on a single server becomes so heavy that the load is distributed among a plurality of servers, or the destination server is temporarily changed due to server maintenance, the application does not have to be reinstalled, thereby easily changing the destination server.

A seventh aspect of the present invention is directed to a computer program embodied on a computer readable medium, the computer program being for use in a communications terminal capable of communicating with a server via a network. The computer program includes the steps of executing an application and, before or after the application is activated, making a retrieval request to the server for retrieving an instruction file that describes an instruction for transmitting to the server all or part of data generated as a result of executing the application. Transmission to the server after the application is executed is carried out by following the instruction described in the instruction file transmitted from the server in response to the retrieval request.

In the above described seventh aspect, a request for retrieving an instruction file is made in relation to execution of the application. The communications terminal determines transmission processing to the server based on the instruction file transmitted from the server. Therefore, the transmission processing from the communications terminal to the server can be easily changed only by changing the instruction included in the instruction file. This facilitates changes in data transmission processing to the server. Also, in the above first aspect, the application itself does not have to define anything about transmission processing to the server. Therefore, the amount of application data stored in the terminal can be reduced.

According to an eighth aspect, in the application executing step of the seventh aspect, the application is started to be executed upon receipt of the instruction file transmitted from the server in response to the retrieval request.

In the above described eighth aspect, the user can enable the application to be automatically executed by making a request for retrieving an instruction file.

According to a ninth aspect, in the retrieval request making step of the seventh aspect, the retrieval request is made by specifying the instruction file stored in the server with a Web browser.

In the above described ninth aspect, the user can enable the transmission processing to the server only by carrying out a simple operation on the Web browser, such as clicking link information. Especially, in a case where the communications terminal is a mobile communications terminal, an input device provided thereto is often capable of only a simple operation. In such a case, it is quite effective to be able to execute the transmission processing on the server with such a simple operation.

According to a tenth aspect, in the seventh aspect, the instruction file includes transmission information specifying data for specifying transmission data to be transmitted to the server. The transmitting step includes the steps of determining, based on the transmission information specifying data, the transmission data to be transmitted to the server from among the generated data; and transmitting the transmission data to the server.

In the above described tenth aspect, by changing the transmission information specifying data included in the instruction file, the data to be transmitted to the server can be changed. Therefore, the server can easily change the data to be transmitted to the communications terminal, thereby enabling only the required data to be transmitted to the communications terminal.

According to an eleventh aspect, in the seventh aspect, the instruction file includes transmission format specifying data for specifying a format used for transmitting transmission data to be transmitted to the server. In addition, the transmission processing step includes the steps of determining a transmission format of the transmission data based on the transmission format specifying data; and transmitting the transmission data in the transmission format determined by the transmission format determining unit.

In the above described eleventh aspect, by changing the transmission format specifying data included in the instruction file, the transmission format used for transmitting the data to the server can be changed. Therefore, even if the processing program at the server side is changed and the format of the data to be processed is changed accordingly, the application at the communications terminal side does not have to be changed. Furthermore, even if a plurality of servers support different transmission formats, all of these formats do not have to be defined in the application. That is, even if there are a plurality of servers, their transmission formats do not have to be the same.

According to a twelfth aspect, in the seventh aspect, the instruction file includes destination server specifying data for specifying a destination server in the transmission. The transmission processing unit carries out the transmission to the destination server specified by the destination server specifying data.

In the above described twelfth aspect, by changing the destination server specifying data included in the instruction file, the destination server can be easily changed. Therefore, for example, even if the processing load on a single server becomes so heavy that the load is distributed among a plurality of servers, or the destination server is temporarily changed due to server maintenance, the application does not have to be reinstalled, thereby easily changing the destination server.

A thirteenth aspect of the present invention is directed to a communications system including a communications terminal capable of transmitting data generated as a result of executing an application and a server capable of communicating with the communications terminal via a network. The server includes an instruction file storage unit for storing an instruction file that describes an instruction for transmitting all or part of the generated data, and an instruction file transmitting unit for transmitting the instruction file in response to a retrieval request from the communications terminal for retrieving the instruction file. The communications terminal includes an application executing unit for executing the application, and a retrieval requesting unit for making, before or after the application is activated, a retrieval request to the server for retrieving an instruction file that describes an instruction for transmitting to the server all or part of data generated as a result of executing the application. A transmission processing unit is also provided for carrying out transmission to the server after the application is executed, by following the instruction described in the instruction file transmitted from the server in response to the retrieval request.

In the above thirteenth aspect, a request for retrieving an instruction file is made in relation to execution of the application. The communications terminal determines transmission processing to the server based on the instruction file transmitted from the server. Therefore, the transmission processing from the communications terminal to the server can be easily changed only by changing the instruction included in the instruction file. This facilitates changes in data transmission processing to the server. Also, in the above first aspect, the application itself does not have to define anything about transmission processing to the server. Therefore, the amount of application data stored in the terminal can be reduced.

A fourteenth aspect of the present invention is directed to a data transmission method used in a network including a communications terminal capable of transmitting data generated as a result of executing an application and a server capable of communicating with the communications terminal via the network. An instruction file that describes an instruction for transmitting all or part of the generated data from the communications terminal is stored in advance. The method includes executing an application and before or after the application is activated, making a retrieval request to the server for retrieving an instruction file that describes an instruction for transmitting to the server all or part of data generated as a result of executing the application. In response to the retrieval request, an instruction file previously stored in the server is transmitted to the communications terminal that made the retrieval request, and transmission to the server after the application is executed is carried out by following the instruction described in the instruction file transmitted from the server in response to the retrieval request.

In the above fourteenth aspect, a request for retrieving an instruction file is made in relation to execution of the application. The communications terminal determines transmission processing to the server based on the instruction file transmitted from the server. Therefore, the transmission processing from the communications terminal to the server can be easily changed only by changing the instruction included in the instruction file. This facilitates changes in data transmission processing to the server. Also, in the above first aspect, the application itself does not have to define anything about transmission processing to the server. Therefore, the amount of application data stored in the terminal can be reduced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 is an example illustration of an instruction file according to the present embodiment.

DESCRIPTION OF THE PREFERRED EMBODIMENT

Figure 1:
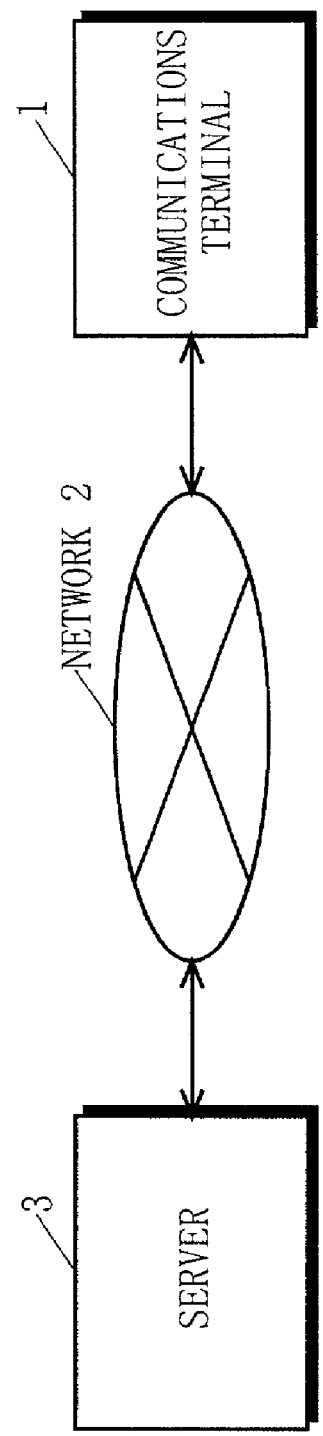
FIG. 1 is a block diagram showing the structure of a network system including a communications terminal according to one embodiment of the present invention.

FIG. 1 is a block diagram showing the structure of a network system including a communications terminal according to one embodiment of the present invention. In FIG. 1, the network system includes a communications terminal 1, a network 2, and a server 3. The server 3 is a so-called WWW server. The communications terminal 1 may be a mobile terminal such as a cellular phone. Note that, although not shown, the network system includes a plurality of communications terminals in addition to the communications terminal 1, and a plurality of servers in addition to the server 3.

Upon receiving a request from the communications terminal 1, the server 3 transmits an instruction file to the communications terminal 1. The instruction file is a file that includes information about instructions for transmitting data from the communications terminal to the server. That is, the communications terminal determines, by following the instructions described in the instruction file, what data should be transmitted to which server in which format. A specific example of the instruction file is shown in FIG. 9. Note herein that, in the following description, data transmitted from the communications terminal to the external server by following the instructions described in the instruction file is called "transmission data".

Figure 2:
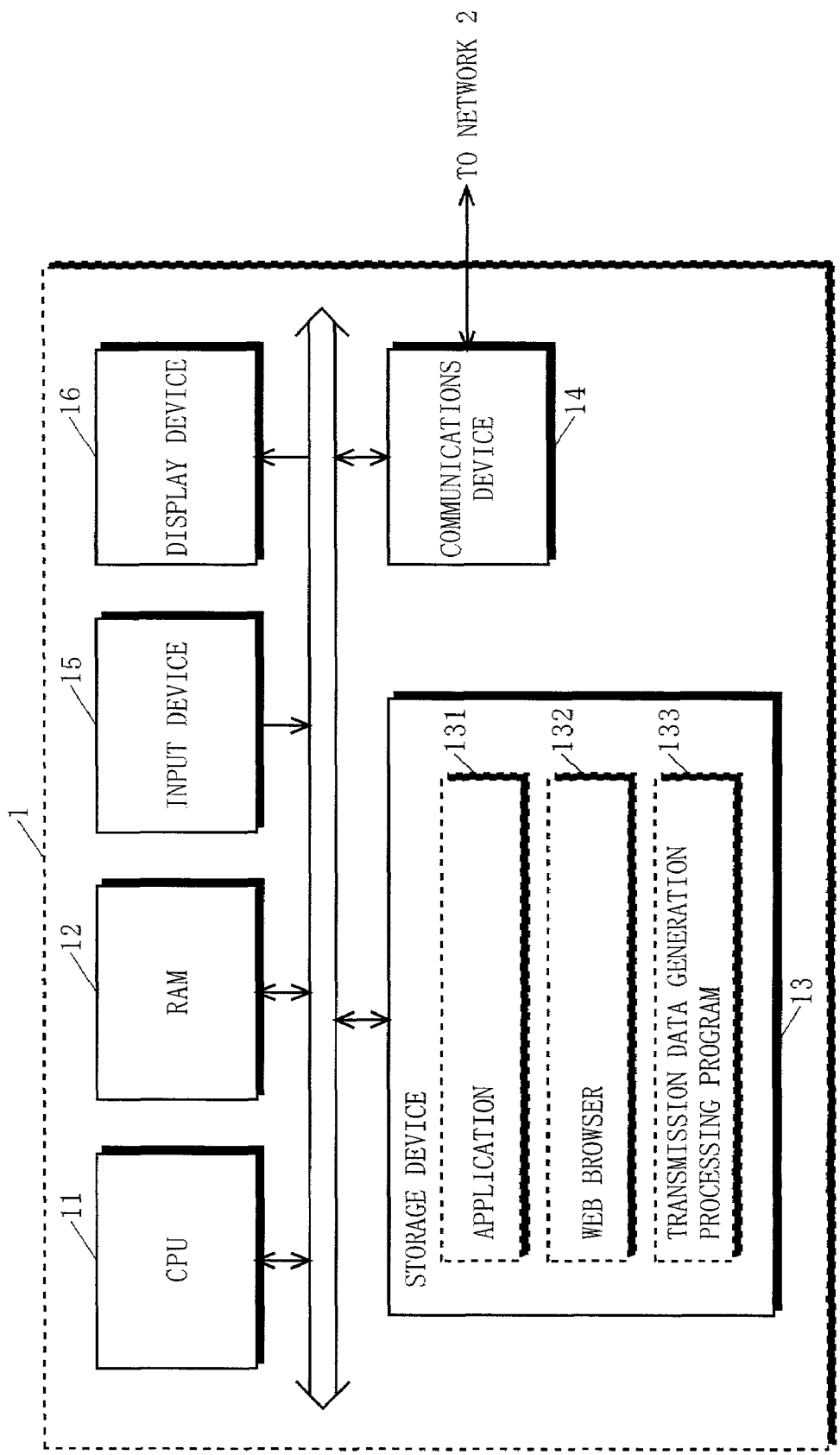
FIG. 2 is a diagram showing a hardware structure of a communications terminal 1 shown in FIG. 1.

FIG. 2 is a diagram showing a hardware structure of the communications terminal 1 shown in FIG. 1. The communications terminal 1 includes a CPU 11, RAM 12, a storage device 13, a communications device 14, an input device 15, and a display device 16. The CPU 11 uses the RAM 12 as a working area for executing a program stored in the storage device 13.

The storage device 13 is structured by a ROM, a hard disk, or the like, for storing an application 131, a Web browser 132, and a transmission data generation program 133. In the present embodiment, the application 131 is a "Whack-A-Mole" game application. The storage device 13 may store a plurality of applications. The Web browser 132 is a program for retrieving content held in the server 3 and carrying out display and other processing. The transmission data generation program 133 is a program for generating transmission data to be transmitted from the communications terminal 1 to the server 3 by following the above instructions for transmission described in the instruction file. Although not shown, the storage device 13 also stores data generated as a result of executing the application 131.

The communications unit 14 transmits/receives data to/from the server 3 via the network 2. The input device 15 is structured by, for example, a keyboard for providing an input of instructions from the user. The display device 16 is structured by, for example, a liquid crystal display for displaying a Web page or images based on the application. Note that the other communications terminals included in the network system of FIG. 1 are similar in structure to the communications terminal 1.

Figure 3:
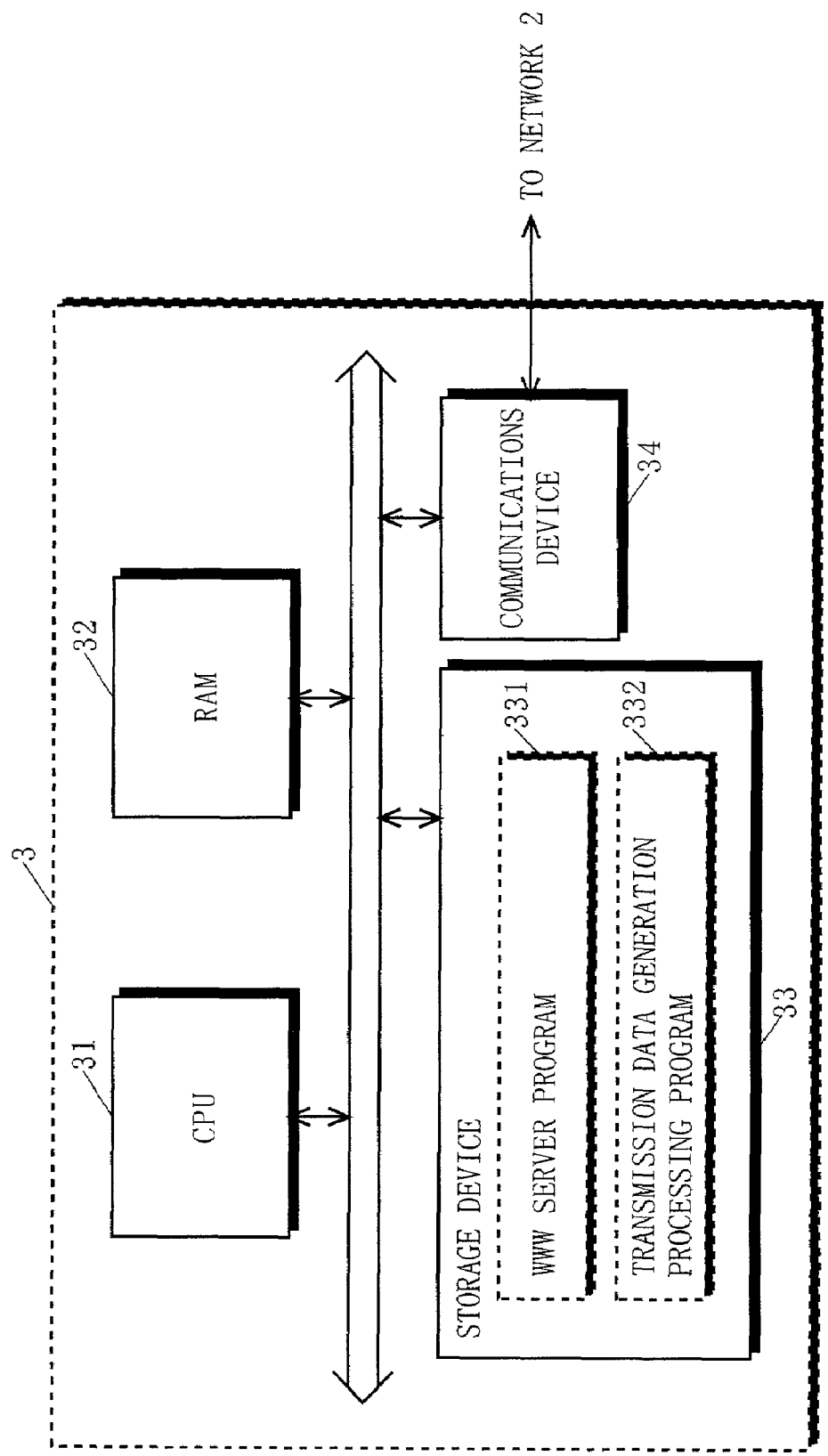
FIG. 3 is a diagram showing a hardware structure of a server 3 shown in FIG. 1.

FIG. 3 is a diagram showing a hardware structure of the server 3 shown in FIG. 1. The server 3 includes a CPU 31, RAM 32, a storage device 33, and a communications device 34. The CPU 31 uses the RAM 32 as a working area for executing a program stored in the storage device 33.

The storage device 33 is structured by, for example, a hard disk or the like for storing a WWW server program 331 and a transmission data processing program 332. The WWW server program 331 is a program so that the server 3 can carry out data transmission with the communications terminal 1. The transmission data processing program 332 is a program for carrying out processing when the server 3 receives the transmission data transmitted from the communications terminal 1. Although not shown, the storage device 33 also stores contents for transmission to the communications terminals, transmission data received from the communications terminals, and other material.

The communications device 34 carries out data transmission with each communications terminal via the network 2. Note that the other servers included in the network system of FIG. 1 are similar in structure to the server 3.

Figure 4:
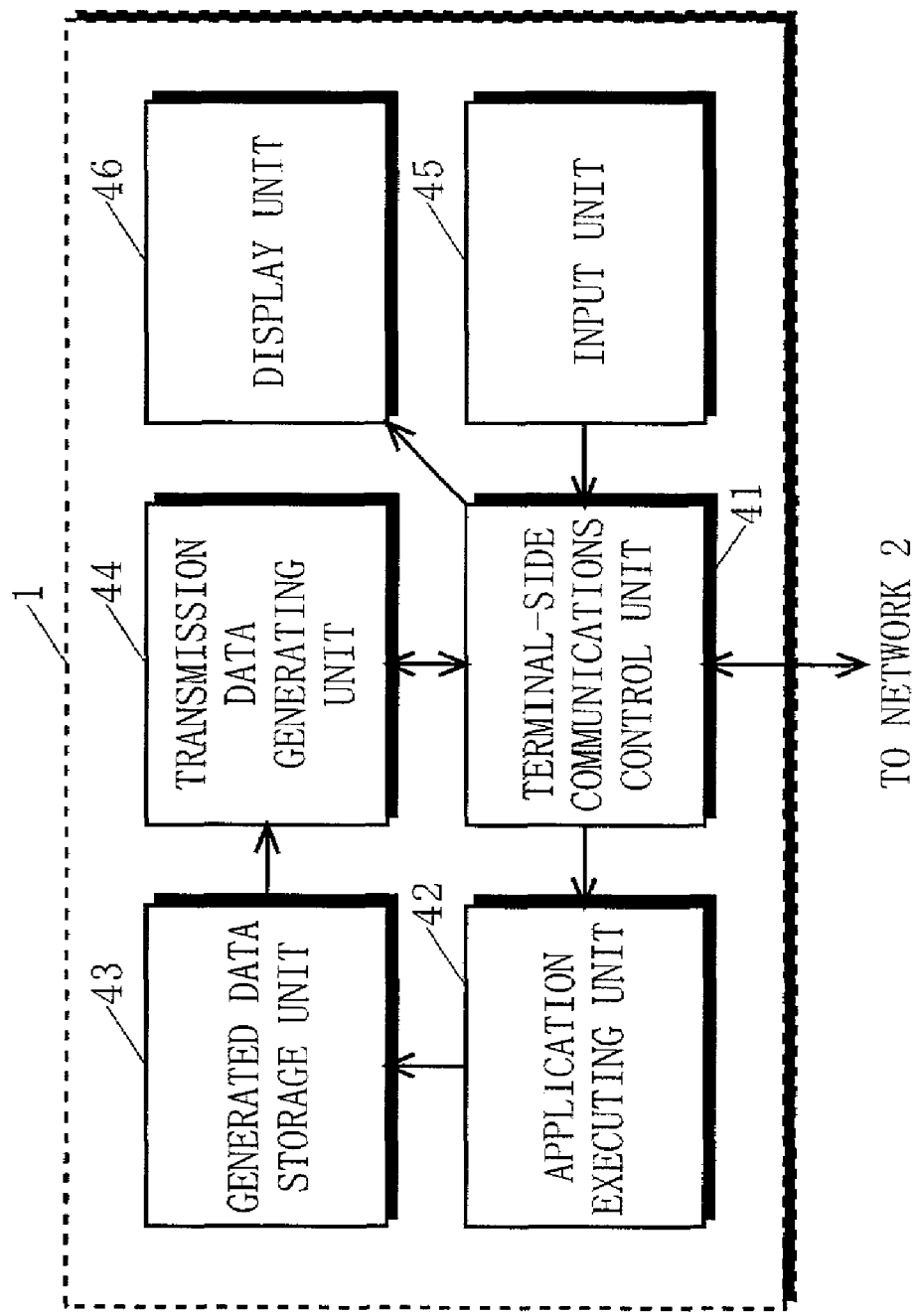
FIG. 4 is a block diagram showing a functional structure of the communications terminal 1 shown in FIG. 1.

FIG. 4 is a block diagram showing a functional structure of the communications terminal 1 shown in FIG. 1. In FIG. 4, the communications terminal 1 includes a terminal-side communications control unit 41, an application executing unit 42, a generated data storage unit 43, a transmission data generating unit 44, an input unit 45, and a display unit 46.

Figure 6:
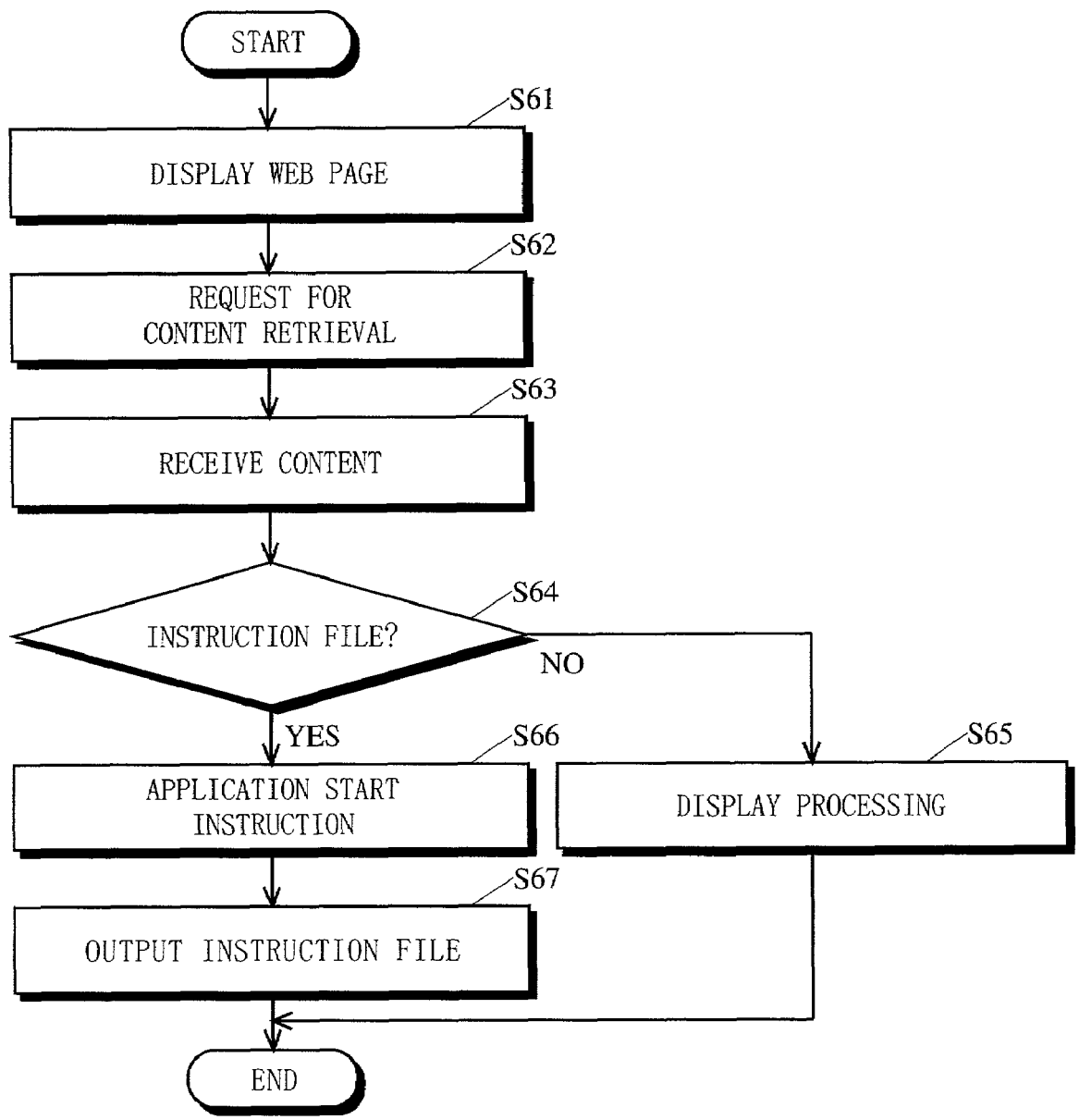
FIG. 6 is a flowchart showing a flow of content retrieval processing carried out in a terminal-side communications control unit 41 shown in FIG. 4.

The terminal-side communications control unit 41 carries out content retrieval processing, and the details on the content retrieval processing are shown in FIG. 6. The terminal-side communications control unit 41 is realized by the CPU 11 and the RAM 12 that execute the Web browser 132, and the communications unit 14. The terminal-side communications control unit 41 implements a protocol for accessing the Internet (typically, HTTP (Hypertext Transfer Protocol)), and carries out data communications with the server 3 via the network 2. The terminal-side communications control unit 41 is connected to the server 3 via the network 2 for retrieving a content stored in the server 3 and carrying out predetermined processing. Also, the terminal-side communications control unit 41 is capable of requesting that the server 3 execute the transmission data processing program 332. Typically, the transmission data processing program 332 is realized by a CGI (Common Gateway Interface).

The application executing unit 42 is realized by the CPU 11 and the RAM 12 that execute the application 131. Here, data generated by the application executing unit 42 is called generated data. The generated data storage unit 43 is realized by the storage device 13 for storing the above generated data.

Figure 8:
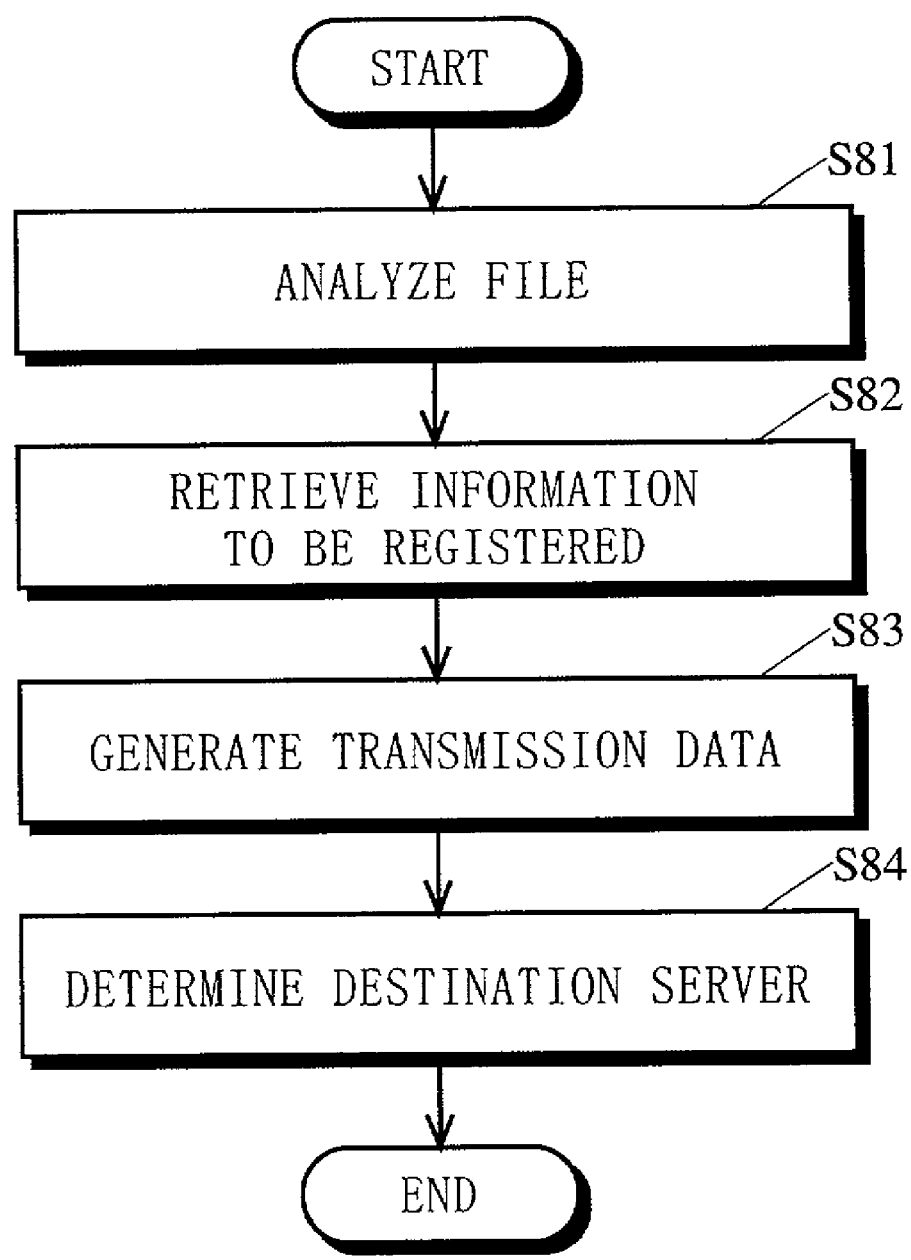
FIG. 8 is a flowchart showing a flow of transmission data generation processing carried out by a transmission data generating unit 44 shown in FIG. 4.

The transmission data generating unit 44 carries out transmission data generation processing. Details on the transmission data generation processing are shown in FIG. 8. The transmission data generating unit 44 is realized by the CPU 11 and the RAM 12 that execute the transmission data generation program 133. The input unit 45 is realized by the input device 15. The display unit 46 is realized by the display device 16.

Figure 5:
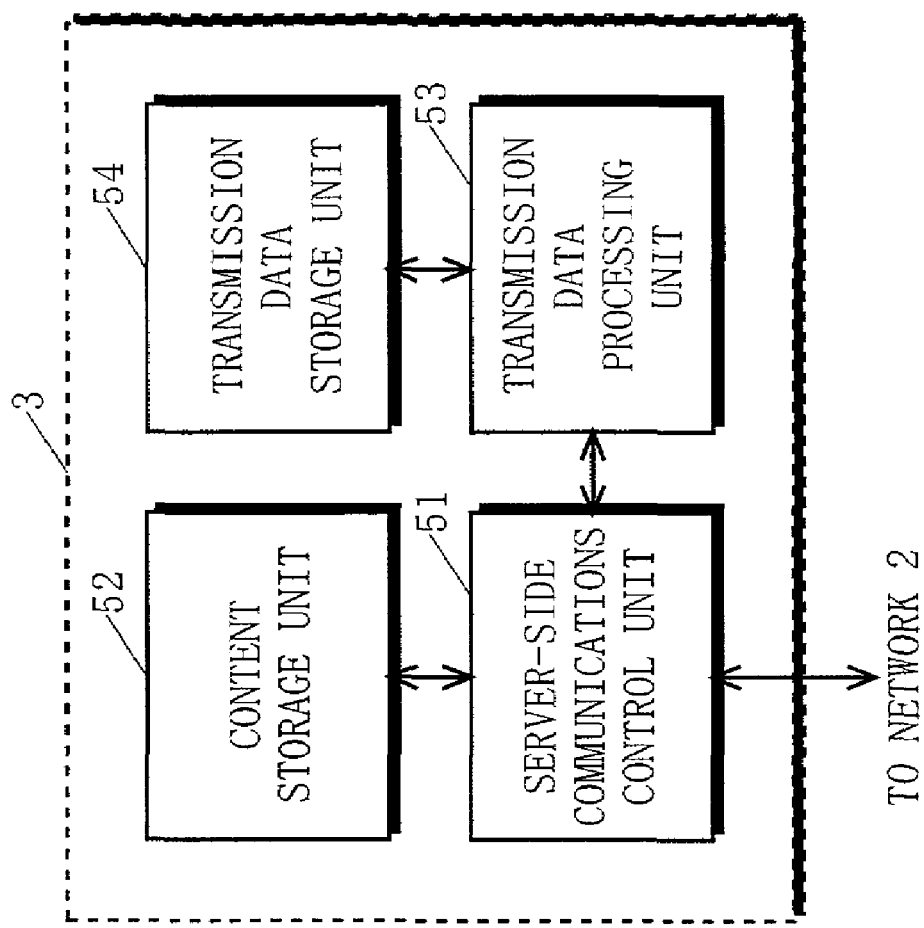
FIG. 5 is a block diagram showing a functional structure of the communications terminal 1 shown in FIG. 1.

FIG. 5 is a block diagram showing a functional structure of the server 3 shown in FIG. 1. The server 3 includes a server-side communications control unit 51, a content storage unit 52, a transmission data processing unit 53, and a transmission data storage unit 54.

Figure 7:
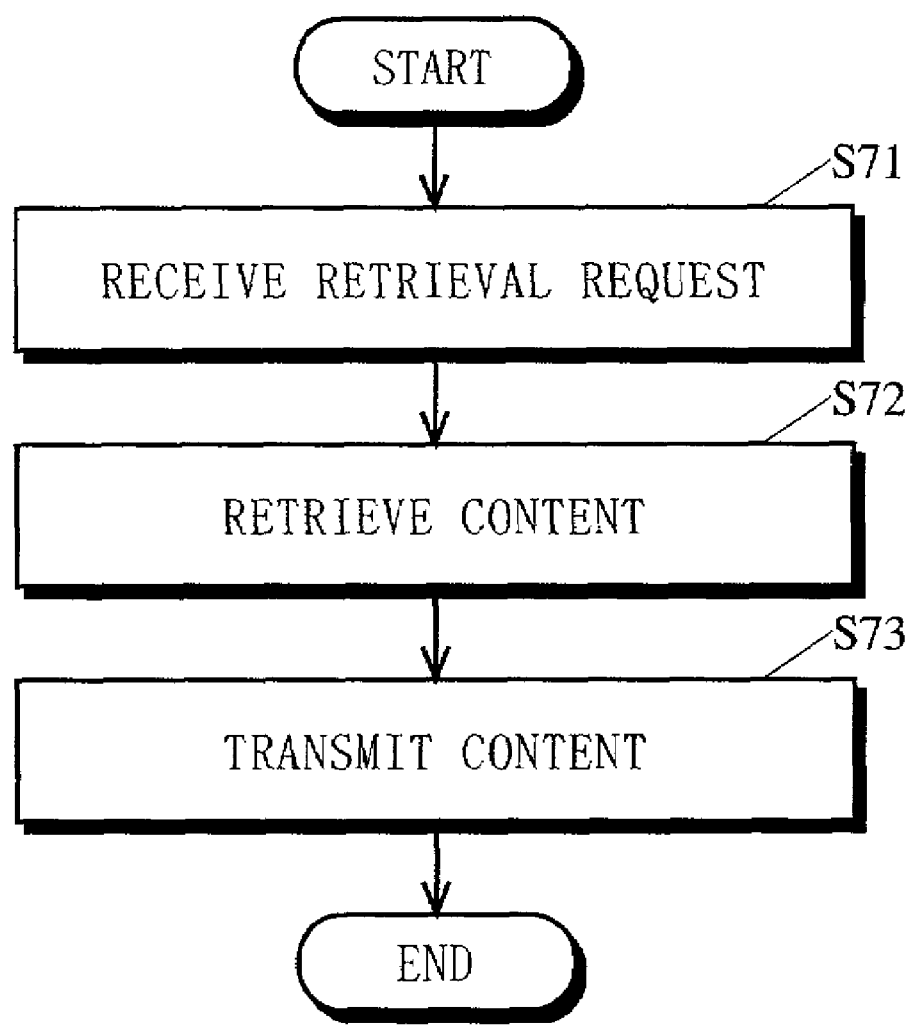
FIG. 7 is a flowchart showing a flow of content transmission processing carried out in a server-side communications control unit 51 shown in FIG. 5.

The server-side communications control unit 51 carries out content transmission processing. Details on the content transmission processing are shown in FIG. 7. The server-side communications control unit 51 is realized by the CPU 31 and the RAM 32 that execute the WWW server program 331, and the communications device 34.

The content storage unit 52 is realized by the storage device 33 for storing contents. Here, contents are broadly categorized into two types. One type is the above mentioned instruction file. The other type is data processed by the Web browser 132. Such data is typified by a Web page described in HTML (Hypertext Markup Language), or may be still pictures, music, video, or the like.

The transmission data processing unit 53 receives the instruction file from the communications terminal 1. The transmission data processing unit 53 is realized by the CPU 31 and the RAM 32 that execute the transmission data processing program 332. The transmission data storage unit 54 is realized by the storage device 33 for storing the transmission data.

Described below is the operation of the network system shown in FIG. 1. Here, described is a case where the operation is carried out between the communications terminal 1 and the server 3. More specifically, assume herein that the application 131 executed by the communications terminal 1 is a "Whack-A-Mole" game application, and a high score is transmitted as the transmission data to the server 3.

First, the terminal-side communications control unit 41 carries out content retrieval processing. FIG. 6 is a flowchart showing the flow of the content retrieval processing carried out by the terminal-side communications control unit 41 shown in FIG. 4. First, the terminal-side communications control unit 41 causes the display unit 46 to display a Web page received from the server 3 (step S61). Here, the user uses the input unit 45 to select anchor information displayed as a link on the Web page. To start the game application, the user selects anchor information linked to the application. For example, the user selects anchor information linked to the "Whack-A-Mole" game application for execution.

Next, the terminal-side communications control unit 41 sends a content retrieval request to a server specified by a URL (Uniform Resource Locator) (in the present embodiment, the server 3) linked to the anchor information selected by the user (step S62). The data transmitted to the server 3 as the retrieval request includes the above URL. Upon receiving the content retrieval request sent in step S62, the server-side communications control unit 51 of the server 3 carries out content transmission processing. Described below is the content transmission processing in the server-side communications control unit 51.

FIG. 7 is a flowchart showing a flow of the content transmission processing carried out by the server-side communications control unit 51 shown in FIG. 5. First, the server-side communications control unit 51 receives a content retrieval request transmitted from the communications terminal 1 (step S71). Then, the server-side communications control unit 51 retrieves, from the content storage unit 52, content linked to the URL included in the received retrieval request (step S72). In step S72, if the URL is linked to an instruction file, for example, the server-side communications control unit 51 retrieves the instruction file. If the URL is linked to a Web page, the server-side communications control unit 51 retrieves data of the Web page. Finally, the server-side communications control unit 51 transmits the content retrieved in step S72 to the terminal 1 (step S73), and then ends the procedure.

Referring back to FIG. 6, the terminal-side communications control unit 41 receives the content transmitted from the server 3 (step S63). Then, the terminal-side communications control unit 41 determines which application should be used based on the type of content received in step S63 (step S64). That is, the terminal-side communications control unit 41 determines whether the received content is an instruction file or not. If it is determined in step S64 that the received content is not an instruction file but data to be processed by the Web browser 132, the terminal-side communications control unit 41 carries out a display processing (step S65). Specifically, the terminal-side communications control unit 41 causes the display unit 46 to display the content received in step S63.

On the other hand, if it is determined in step S64 that the received content is an instruction file, the terminal-side communications control unit 41 outputs to the application executing unit 42 an instruction for starting the application 131 (step S66). The terminal-side communications control unit 41 then outputs the received content, that is, the instruction file, to the transmission data generating unit 44 (step S67), and then ends the procedure. Thus, the content retrieval processing in the terminal-side communications unit 41 is completed.

In response to the instruction for starting the application 131 supplied from the terminal-side communications control unit 41 in the above step S66 of FIG. 6, the application executing unit 42 starts executing the application 131. In the present embodiment, the "Whack-A-Mole" game is started. Moreover, the application executing unit 42 outputs the above mentioned generated data to the generated data storage unit 43. In the present embodiment, as the generated data, a high score obtained in the "Whack-A-Mole" game and the level of difficulty at the time of obtaining the high score are outputted to the generated data storage unit 43. The generated data storage unit 43 stores the generated data supplied by the application executing unit 42.

In response to the instruction file supplied by the terminal-side communications control unit 41 in the above step S67 of FIG. 6, the transmission data generating unit 44 carries out transmission data generation processing. FIG. 8 is a flowchart showing a flow of the transmission data generation processing carried out by the transmission data generating unit 44 shown in FIG. 4. First, the transmission data generating unit 44 analyzes the instruction file supplied by the terminal-side communications control unit 41 (step S81). Described below is a specific example of the instruction file.

FIG. 9 is an example illustration of the instruction file according to the present embodiment. Note that, in FIG. 9, the instruction file is described in XML (eXtensible Markup Language) format. As illustrated in FIG. 9, the instruction file includes transmission information specifying data 91, transmission format specifying data 92, and destination server specifying data 93. The transmission information specifying data 91 describes what data is transmitted from the communications terminal 1. That is, the transmission information specifying data 91 specifies data to be transmitted as the transmission data. In FIG. 9, high score information representing the game results is transmitted as the transmission data.

The transmission format specifying data 92 describes information about a format to be used for generating data to be transmitted. That is, the transmission format specifying data 92 specifies the format to be used for transmitting the transmission data. In FIG. 9, a query is used for transmission, "GET" is used as a command (method) for transmitting the transmission data, and the transmission data is transmitted as not being compressed.

The destination server specifying data 93 describes a location of the destination server. That is, the destination server specifying data 93 specifies the server to which the transmission data is transmitted. In FIG. 9, the transmission data is transmitted to the server located at http://game.xxx/regist.xxx (the server 3, in the present embodiment). Note that the server to which the instruction file is transmitted is not necessarily the same as the one that should receive the transmission data.

Note that, in FIG. 9, the instruction file is described in XML format, but may be described in text or binary format. Also, the instruction file may also include data required at the time of executing the application. For example, if the application is schedule management software and schedule information is stored in the server, the schedule information may be included in the instruction file.

Referring back to FIG. 8, in step S81, the transmission data generating unit 44 extracts information required for transmitting the transmission data, from the transmission information specifying data 91, the transmission format specifying data 92, and the destination server specifying data 93 included in the instruction file shown in FIG. 9, and stores the extracted information. In the present embodiment, the transmission data generating unit 44 extracts, from the transmission information specifying data 91, information that the high score information is transmitted as the transmission data, and stores the extracted information. The transmission data generating unit 44 extracts, from the transmission format specifying data 92, information that the transmission data is not compressed and is concatenated with a URL indicating the location of the CGI for transmission in a query format, and information that GET is used as the method in HTTP. Then, the transmission data generating unit 44 stores the extracted information. The transmission data generating unit 44 extracts, from the destination server specifying data 93, information that the transmission data is transmitted to the server located at "http://game.xxx/regist.xxx.", and stores the extracted information.

The transmission data generating unit 44 then determines the transmission data among the generated data (step S82). Specifically, the transmission data generating unit 44 refers to the information stored in step S81 to retrieve the data stored in the generated data storage unit 43. In the present embodiment, the transmission data generating unit 44 retrieves the high score information stored in the generated data storage unit 43.

The transmission data generating unit 44 then determines the transmission format of the transmission data (step S83). Specifically, the transmission data generating unit 44 refers to the information stored in step S81 to generate the transmission data from the data retrieved in step S82. In the present embodiment, the transmission data generating unit 44 generates, from the high score information retrieved in step S82, the transmission data uncompressed and represented in query format. Note that a program for generating the transmission data is previously stored in the transmission data generating unit 44.

Furthermore, the transmission data generating unit 44 determines the server to which the transmission data is transmitted (step S84), and then ends the procedure. Specifically, the transmission data generating unit 44 refers to the information stored in step S81 to determine the destination server. As stated above, in the present embodiment, assume that the destination server is the server 3. That is, assume the URL included in the destination server specifying data 93 of FIG. 9 indicates the server 3.

The transmission data generated in the above stated manner is outputted to the terminal-side communications control unit 41. The terminal-side communications control unit 41 transmits the transmission data received from the transmission data generating unit 44 to the server 3 via the network 2. Specifically, the terminal-side communications control unit 41 concatenates an URL indicating the location of the CGI previously stored in the server 3 with the transmission data, and transmits the resultant data in a query format to the server 3.

Upon receiving the transmission data, the server-side communications control unit 51 outputs the transmission data to the transmission data processing unit 53. Upon receiving the transmission data, the transmission data processing unit 53 carries out predetermined processing. In the present embodiment, assume herein that the predetermined processing is registration of the transmission data. Specifically, the CGI program linked to the URL transmitted from the communications terminal 1 is executed, and by analyzing the query part, the transmission data is registered in the transmission data storage unit 54.

In the present embodiment, the transmission data processing unit 53 carries out registration of the transmission data when receiving the transmission data. This is not restrictive, and the server 3 may transmit some data to the communications terminal 1. That is, in response to the transmission data, the transmission data processing unit 53 may transmit the information stored in the content storage unit 52 or the transmission data storage unit 54 to the communications terminal 1. For example, the server 3 stores, as the transmission data, game scores received from a plurality of communications terminals. When receiving new transmission data from the communications terminal 1, the server 3 calculates a position in the game in relation to the other users, and then transmits the game position data to the communications terminal 1. Also, the transmission data processing unit 53 of the server 3 may simply report that it has received the transmission data.

As such, in the present embodiment, described is a case where the transmission data transmitted from the communications terminal is a game score as a result of executing a game application. In another embodiment, however, the application is not restricted to a game. For example, the application may be the one used for uploading information stored in the communications terminal, such as schedule information, to the server.

In the present embodiment, the instruction file includes the transmission information specifying data 91, the transmission format specifying data 92, and the destination server specifying data 93. In another embodiment, however, the instruction file may include at least one of the above three types of data. In this case, the data not set by the instruction file may be set by default in the communications terminal.

Also, the communications terminal 1 may carry out data authentication on the retrieved instruction file. That is, the communications terminal 1 may carry out authentication to see whether the instruction file has been tampered with, whether the server that transmitted the instruction file is an authorized server, or the like. Thus, it is possible to prevent erroneous data transmission processing based on the tampered instruction file. It is also possible to prevent the communications terminal 1 from being infected with a computer virus via a virus-carrying instruction file.

Furthermore, the instruction file may describe an instruction that varies depending on the result of executing the application. For example, such an instruction may be described as that the transmission data is transmitted with a method "POST" if the amount of transmission data is large, while with a method "GET" if the amount is small. Also, for example, such an instruction may be described as that data indicating the result of executing the application is transmitted if the application operates correctly, otherwise details on error and cause of error are transmitted. Furthermore, upon receiving details on error and cause of error, the server may transmit information about how to solve the error to the communications terminal, thereby enabling the user to facilitate error handling.

In the present embodiment, the application executing unit 42 starts executing the application 131 when receiving the instruction file from the terminal-side communications control unit 41. Here, the application may be started anytime before the transmission data generating unit 44 retrieves the generated data.

In the present embodiment, no description is given to the user's input operations in the course of the processing by the communications terminal 1 from retrieving the instruction file to transmitting the transmission data. However, a pop-up display, for example, may appear on the screen of the display unit 46 for inquiring of the user about whether to carry out data transmission, thereby prompting the user to enter some input.

Described above is a case where transmission of the instruction file and the transmission data is carried out between the server 3 and the communications terminal 1. Such transmission is also carried out between any server other than the server 3 and any communications terminal other than the communications terminal 1.

Furthermore, the present invention can be realized by a computer program, and can also be easily achieved on another independent computer system via a recording medium with the computer program recorded thereon.

While the invention has been described in detail, the foregoing description is in all aspects illustrative and not restrictive. It is understood that numerous other modifications and variations can be devised without departing from the scope of the invention.

What is claimed is:

1. A communications terminal for communicating with a server via a network, said communications terminal comprising:
   a storage unit for storing an application;
   an application executing unit for executing the application so as to generate data;
   a generated data storage unit for storing the data generated due to execution of the application by the application executing unit;
   a retrieval requesting unit for making a retrieval request to the server to retrieve an instruction file, said instruction file including transmission information specifying data for specifying transmission data to be transmitted to the server;
   a transmission data generating unit for determining, from among the generated data stored in said generated data storage unit, the transmission data to be transmitted to the server based on destination server specifying data in said instruction file which specifies a destination server of the transmission data; and
   a transmitting unit for transmitting the transmission data to the server.

2. The communications terminal of claim 1, wherein said retrieval requesting unit is operable to make the retrieval request before or after the application is activated.

3. The communications terminal of claim 1, wherein said application executing unit is operable to begin execution of the application upon receipt of said instruction file transmitted from the server in response to the retrieval request.

4. The communications terminal of claim 1, wherein said retrieval requesting unit is operable to make the retrieval request by using a web browser to specify said instruction file stored in the server.

5. The communications terminal of claim 1, wherein said instruction file further includes transmission format specifying data for specifying a format to be used for transmitting the transmission data to the server, and said transmitting unit includes a transmission format determining unit for determining a transmission format of the transmission data based on said transmission format specifying data, said transmitting unit being operable to transmit the transmission data in the transmission format determined by said transmission format determining unit.

6. The communications terminal of claim 1, wherein said instruction file further includes destination server specifying data for specifying a destination server to which the transmission data is to be transmitted, said transmitting unit being operable to transmit the transmission data to the destination server specified by said destination server specifying data.

7. A data transmission program on a computer readable medium, said data transmission program to be used in a communications terminal operable to communicate with a server via a network, said data transmission program comprising:
   storing an application;
   executing the application so as to generate data;
   storing the data generated due to execution of the application;
   making a retrieval request to the server to retrieve an instruction file, said instruction file including transmission information specifying data for specifying transmission data to be transmitted to the server;
   determining, from among the stored data generated by the application, the transmission data to be transmitted to the server based on destination server specifying data in said instruction file which specifies a destination server of the transmission data; and
   transmitting the transmission data to the server.

8. The data transmission program of claim 7, wherein said making the retrieval request comprises making the retrieval request before or after the application is activated.

9. The data transmission program of claim 7, wherein said executing the application comprises beginning the execution of the application upon receipt of said instruction file transmitted from the server in response to the retrieval request.

10. The data transmission program of claim 7, wherein said making the retrieval request comprises using a web browser to specify said instruction file stored in the server.

11. The data transmission program of claim 7, wherein said instruction file further includes transmission format specifying data for specifying a format to be used for transmitting the transmission data to the server, and said transmitting further includes determining a transmission format of the transmission data based on said transmission format specifying data, and transmitting the transmission data in the transmission format.

12. The data transmission program of claim 7, wherein said instruction file further includes destination server specifying data for specifying a destination server to which the transmission data is to be transmitted, said transmitting further including transmitting the transmission data to the destination server specified by said destination server specifying data.

13. A communications system comprising:
   a server including:
      an instruction file storage unit for storing an instruction file; and
      an instruction file transmitting unit for transmitting the instruction file in response to a retrieval request; and
   a communications terminal including:
      a storage unit for storing an application;
      an application executing unit for executing the application so as to generate data;
      a generated data storage unit for storing the data generated due to execution of the application by the application executing unit;
      a retrieval requesting unit for making the retrieval request to said server to retrieve said instruction file, said instruction file including transmission information specifying data for specifying transmission data to be transmitted to said server;
      a transmission data generating unit for determining, from among the generated data stored in said generated data storage unit, the transmission data to be transmitted to said server based on destination server specifying data in said instruction file which specifies a destination server of the transmission data; and
      a transmitting unit for transmitting the transmission data to said server.

14. The communications system of claim 13, wherein said retrieval requesting unit is operable to make the retrieval request before or after the application is activated.

15. The communications system of claim 13, wherein said application executing unit is operable to begin execution of the application upon receipt of said instruction file transmitted from said server in response to the retrieval request.

16. The communications system of claim 13, wherein said retrieval requesting unit is operable to make the retrieval request by using a web browser to specify said instruction file stored in said server.

17. A data transmission method to be used in a network including a communications terminal operable to transmit data generated by executing an application and a server operable to communicate with the communications terminal via the network, said method comprising:

storing an instruction file in the server;

storing an application;

executing the application so as to generate data;

storing the data generated due to execution of that application;

making a retrieval request to the server to retrieve the stored instruction file, the instruction file including transmission information specifying data for specifying transmission data to be transmitted to the server;

transmitting the previously-stored instruction file from the server to the communications terminal that made the retrieval request in response to the retrieval request;

determining, from among the stored data generated by the application, the transmission data to be transmitted to the server based on destination server specifying data in said instruction file which specifies a destination server of the transmission data; and transmitting the transmission data to the server.

18. The data transmission method of claim 17, wherein said making the retrieval request comprises making the retrieval request before or after the application is activated.

19. The data transmission method of claim 17, wherein said executing the application comprises beginning the execution of the application upon receipt of the instruction file transmitted from the server in response to the retrieval request.

20. The data transmission method of claim 17, wherein said making the retrieval request comprises using a web browser to specify the instruction file stored in the server.

* * * * *